(12) United States Patent
Aufrere et al.

(10) Patent No.: US 8,813,579 B2
(45) Date of Patent: Aug. 26, 2014

(54) PRESSURE SENSITIVE TRANSDUCER ASSEMBLY AND CONTROL METHOD FOR A SYSTEM INCLUDING SUCH AN ASSEMBLY

(75) Inventors: Etienne Aufrere, Geispolsheim (FR); Christophe Mahr, Schaeffersheim (FR); Stephane Auberger, Les Bordes (FR); Pierre-Benoit Prud'Homme, Strasbourg (FR)

(73) Assignee: Delphi Technologies, Inc., Troy, MI (US)

( * ) Notice: Subject to any disclaimer, the term of this patent is extended or adjusted under 35 U.S.C. 154(b) by 26 days.

(21) Appl. No.: 13/813,212

(22) PCT Filed: Jul. 29, 2011

(86) PCT No.: PCT/EP2011/063117
§ 371 (c)(1),
(2), (4) Date: Sep. 6, 2013

(87) PCT Pub. No.: WO2012/013785
PCT Pub. Date: Feb. 2, 2012

(65) Prior Publication Data
US 2014/0007706 A1    Jan. 9, 2014

(30) Foreign Application Priority Data
Jul. 30, 2010 (EP) ................... 10171502

(51) Int. Cl.
*G01L 1/04* (2006.01)
*G01L 1/22* (2006.01)

(52) U.S. Cl.
USPC ............ 73/862.629; 73/862.627; 73/862.628

(58) Field of Classification Search
USPC ..................... 73/862.629, 862.628, 862.627
See application file for complete search history.

(56) References Cited

U.S. PATENT DOCUMENTS

| | | | |
|---|---|---|---|
| 6,038,930 A * | 3/2000 | Lehnen et al. | 73/774 |
| 6,348,663 B1 * | 2/2002 | Schoos et al. | 177/144 |
| 2007/0285268 A1 * | 12/2007 | Henze et al. | 340/667 |

FOREIGN PATENT DOCUMENTS

WO    2006/058573    6/2006

OTHER PUBLICATIONS

International Search Report dated Nov. 25, 2011.

* cited by examiner

*Primary Examiner* — Lisa Caputo
*Assistant Examiner* — Jamel Williams
(74) *Attorney, Agent, or Firm* — Lawrence D. Hazelton

(57) ABSTRACT

Pressure sensitive transducer assembly that includes a force sensing resistor. The force sensing resistor includes: first and second substrates; at least a first and a second electrically conductive traces on the inner surface of the first substrate including interdigitated fingers defining a sensitive area; and a resistive layer facing the sensitive area. The force sensing resistor includes an auxiliary trace on the inner surface of the first substrate connecting the first trace to the second trace through a constant resistance that is not dependent on the force applied to the substrates. The constant resistance being of a value largely greater than the value of the variable resistance which can be measured indirectly between the fingers when an external force is applied to the substrates. A system and a control method are also proposed.

15 Claims, 3 Drawing Sheets

PRESSURE SENSITIVE TRANSDUCER ASSEMBLY AND CONTROL METHOD FOR A SYSTEM INCLUDING SUCH AN ASSEMBLY

CROSS-REFERENCE TO RELATED APPLICATION

This application claims the benefit under 35 U.S.C. §371 of published PCT Patent Application Number PCT/EP 2011/063117, filed Jul. 4, 2011, claiming priority to European Patent Application Number EP10171502.7 filed on Jul. 30, 2010, and published as WO2012/013785 on Feb. 2, 2012, the entire contents of which is hereby incorporated by reference herein.

TECHNICAL FIELD OF INVENTION

The present invention relates to a pressure sensitive transducer assembly comprising a force sensing resistor.

BACKGROUND OF INVENTION

More particularly, the invention relates to such assembly, or tactile pressure sensor, used in a push button for detecting activation of the button.

Generally, a pressure sensitive transducer assembly comprises a force sensing resistor with connection means, said force sensing resistor comprising: first and second substrates each having inner surfaces, wherein at least one of the substrates is flexible in order to move towards the other one of the substrates in response to an applied force; at least a first and a second electrically conductive traces on the inner surface of the first substrate, said first trace including a first set of fingers interdigitated with a second set of fingers pertaining to the second trace so as to define together a sensitive area on the inner surface of the first substrate, the first set of fingers and the second set of fingers being electrically separated from one another on the inner face of the first substrate; and a resistive layer on the inner surface of the second substrate such that the resistive layer is facing the sensitive area.

In the absence of applied force on the substrates, a first electrical signal indicative of a rest state is produced by a control circuit applying a reference voltage between first and second traces.

In response to a force applied to a flexible one of the substrates, the resistive layer contacts and electrically connects fingers of the first set and fingers of the second set together with a resistance dependent upon resistivity of the resistive layer and dependent upon the applied force. Thus, the control circuit is able to produce a second electrical signal indicative of the applied force when applying said reference voltage between first and second traces.

Such a pressure sensitive transducer assembly is already described in US2006/0007172A1 wherein it comprises a force sensing resistor working without preload in its rest state, an air gap preventing contact between both substrates. Such a force sensing resistor will be designated hereafter as standard force sensing resistor.

WO2009/070503A1 discloses an alternative embodiment wherein the force sensing resistor is designed to work under preload condition in its rest state, the substrates being touching each other even in the absence of an externally applied force. Such a force sensing resistor will be designated hereafter as preloaded force sensing resistor.

Current transducer assemblies are not fully satisfactory because it is not possible to detect easily when the assembly is disconnected from the control circuit as it provides the same output voltage for different situations.

For assemblies using standard force sensing resistor, the output voltage provided to the control circuit through its connection means is substantially equal to a constant voltage both when it is disconnected and in its rest state (without external applied force).

For assemblies using preloaded force sensing resistor, the output voltage provided to the control circuit through its connection means is substantially equal to a constant voltage both when it is disconnected and when the preload condition is lost.

It is particularly important to be able to detect disconnection of the assembly in applications such as in the automotive industry, as a high number of components are assembled simultaneously and the function controlled by the button through the pressure sensitive transducer assembly can be critical.

It is another important issue to be able to make a diagnostic about the status of the force sensing resistor in order to detect abnormalities such as bad contact between the force sensing resistor and the central unit, loss of preload condition, electronics failure, disconnection of the force sensing resistor connector or operation out of the normal operating range of the force sensing resistor.

Common solutions provide either additional contact pins or wires for test purpose by the central unit for checking continuity between the pins and connection of the force sensing resistor and its characteristic, a fixed resistive layer directly printed on the force sensing resistor with an analog driver or camera testing at the end of line tester (EOLT) or in-line tester to check correct insertion of the connector portion of the force sensing resistor into the connection means by using the shape detection principle.

However, adding new pins for test purpose implies a higher cost for the connector and for the force sensing resistor. Visual check and camera testing either EOLT or in-line also increase costs and assembly time and cannot easily implemented due to a small space and bad visibility of the connector area within the product. Further, the only electronics failure that can be detected is a short to ground or to power supply. Any other electronics failure in the force sensing resistor driver will not be detected. Moreover, these common solutions do not permit to distinguish an electronics failure from a use of the force sensing resistor out of its normal operating range. Resolution of an analog driver is not sufficient to detect loss of preload condition. Although contact between the connector portion of the force sensing resistor and the connector may be checked, correct insertion still needs to be checked.

SUMMARY OF THE INVENTION

An objective of the present invention is to overcome the aforecited drawback by providing a solution easy to implement and cost effective.

For that purpose, it is provided a pressure sensitive transducer assembly comprising a force sensing resistor, said force sensing resistor comprising: first and second substrates each having inner surfaces, wherein at least one of the substrates is flexible in order to move towards the other one of the substrates in response to an applied force; electrically conductive traces on the inner surface of at least the first substrate, a first trace including a first set of fingers interdigitated with a second set of fingers pertaining to a second trace so as to define together a sensitive area, the first set of fingers and the second set of fingers being electrically separated from one another on the inner face of the first substrate; and a resistive layer on the inner surface of the second substrate such that the resistive layer is facing the first set of fingers, characterized by an auxiliary trace on the inner surface of one of the substrates connecting the first trace to the second trace through a constant resistance which is not dependent on the force applied to the substrates, said resistance being of a value largely greater than the value of the variable resistance that can be measured indirectly between the traces through the fingers when an external force is applied to the substrates.

An advantage of the present invention is that it requires very few modifications of the pressure sensitive transducer assembly without need for an extra connection pin.

According to an advantageous feature of the invention, said force sensing resistor is configured to work under preload condition, said resistive layer being in contact with fingers even in the rest state of the assembly. In that case, thanks to the auxiliary trace and the constant resistance, it is possible to detect preload lost. Thus, preventive maintenance action can be taken regarding the assembly. A warning signal can be produced to inform the user that the assembly may not work properly.

According to other advantageous features of the invention: said auxiliary trace is arranged outside the sensitive area; the first trace comprises a first transverse arm from which extends a plurality of longitudinal fingers towards a second transverse arm of the second trace, a plurality of longitudinal fingers extending from the second transverse arm towards the first transverse arm, said auxiliary trace extending from a finger free end of the first trace to the second transverse arm; said auxiliary trace comprises a first portion connected to the first trace and a second portion connected to the second trace, said first and second portions being electrically separated from one another by a pad of resistive layer forming the constant resistance; said first, said second, and said auxiliary traces are arranged on the inner surface of the first substrate.

According to still other advantageous features of the invention: the assembly further comprises diagnostic means including said constant resistance for detecting electronics failure of the force sensing resistor; said diagnostic means further includes a frequency driver of the force sensing resistor for detecting loss of preload condition and operation out of normal operating range; said resistance is used for improving detection of loss of preload condition with a more accurate threshold; diagnostic means further includes said resistive layer for detecting bad contact between said assembly and an external central unit through connecting means; said connecting means are made of several connection pins with a specific pattern where the two external connection pins are slightly shorter than other central connection pins and wherein said diagnostic means further includes said specific pattern of the connecting means for detecting disconnection of the assembly.

The invention also provides a system comprising a central unit which controls a pressure sensitive transducer assembly according to anyone of the preceding claims, said central unit being connected to said assembly through connection means in order to apply a reference voltage or frequency between first and second traces of the assembly such that: in the absence of applied force on the substrates, a first electrical signal indicative of a rest state is produced, in response to a force applied to a flexible one of the substrates, a second electrical signal indicative of the applied force is produced, and when the assembly is disconnected, a third electrical signal indicative of assembly disconnection is produced.

Advantageously, when the preload condition is lost and the reference voltage or frequency is applied between first and second traces, a fourth electrical signal indicative of preload condition lost is produced.

The invention provides also a control method for a system as mentioned above, comprising the steps of: applying a reference voltage or frequency between first and second traces through said connection means; measuring the output voltage or frequency of the assembly through said connection means; comparing the output voltage or frequency to various voltage levels; producing an electrical signal indicative of the status of the assembly, characterized in that when the output voltage or frequency is equal to a rest state voltage or frequency measured between first and second traces, a first electrical signal is produced indicative of a rest state of the assembly, when the output voltage or frequency is equal to a predetermined value representative of an applied force on the sensitive area, a second electrical signal is produced indicative of said applied force, and when the output voltage or frequency is substantially equal to a disconnection voltage or frequency indicating disconnection of the assembly, a third electrical signal is produced.

Advantageously, when the output voltage or frequency is substantially equal to a preload lost voltage or frequency measured between first and second traces through said constant resistance, a fourth electrical signal is produced indicative of the preload condition of the assembly being lost.

BRIEF DESCRIPTION OF DRAWINGS

The present invention is now described by way of example with reference to the accompanying drawings in which.

DETAILED DESCRIPTION

In the following description, similar features could be designated by same reference.

Figure 1:
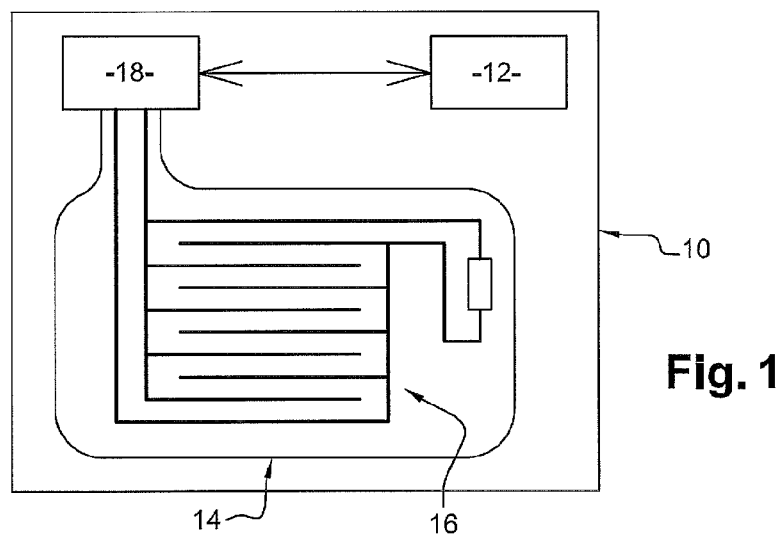
FIG. 1 is a bloc diagram showing schematically a system comprising a pressure sensitive transducer assembly in accordance with the present invention.

Referring now to FIG. 1, a system 10 comprising a central unit 12 which controls a pressure sensitive transducer assembly 14 including a preloaded force sensing resistor 16 in accordance with a preferred embodiment of the present invention is shown. For example, the system 10 is a control panel for use in the passenger compartment of a car.

Said central unit 12 is connected to said assembly 14 through connection means 18 in order to apply a reference voltage Vref or frequency Fref to the assembly 14.

Figure 2:
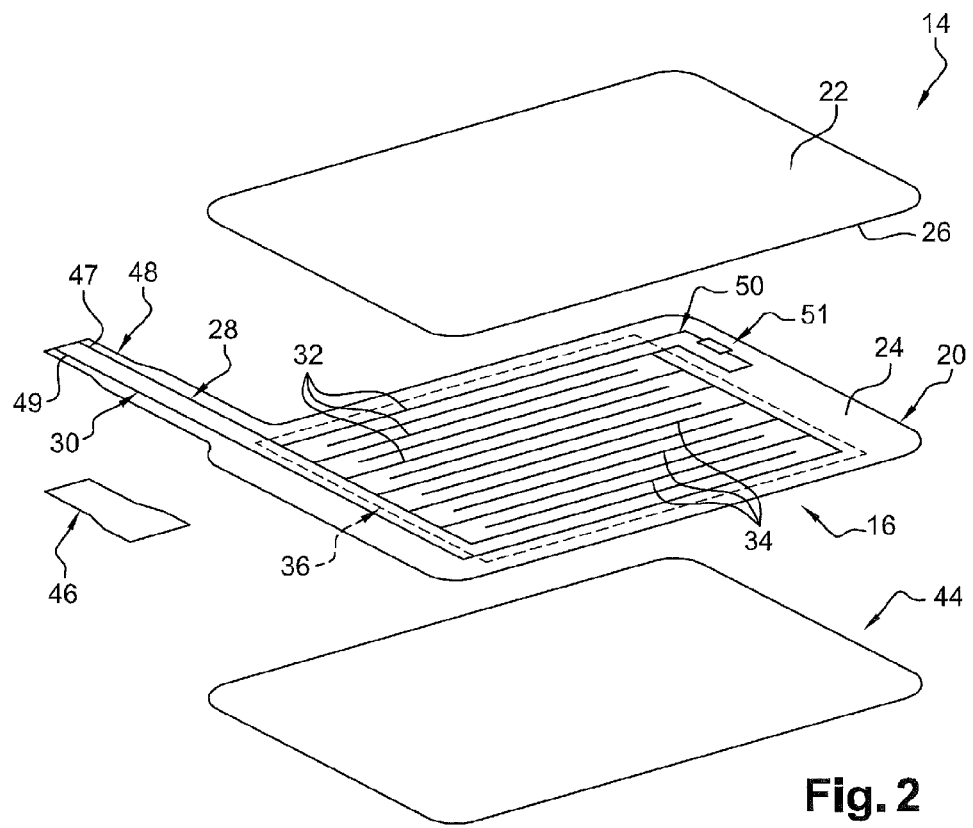
FIG. 2 is an exploded view showing schematically the assembly of FIG. 1 and the structure of its preloaded force sensing resistor.
Figure 3:
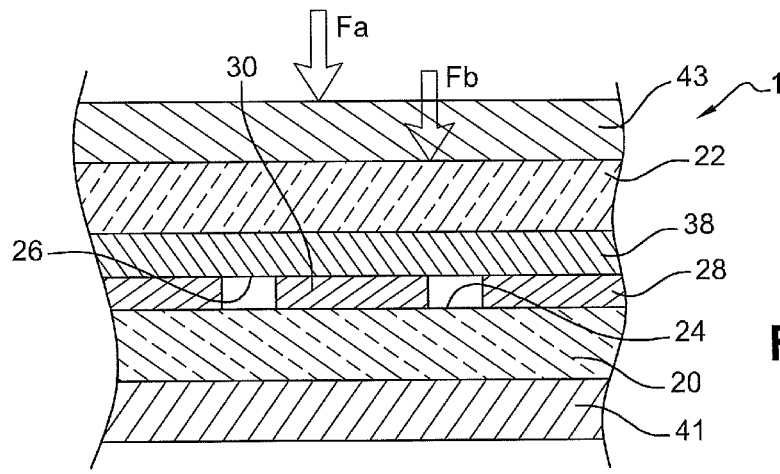
FIG. 3 is a partial cross section view showing schematically the force sensing resistor of FIG. 2.
Figure 4:
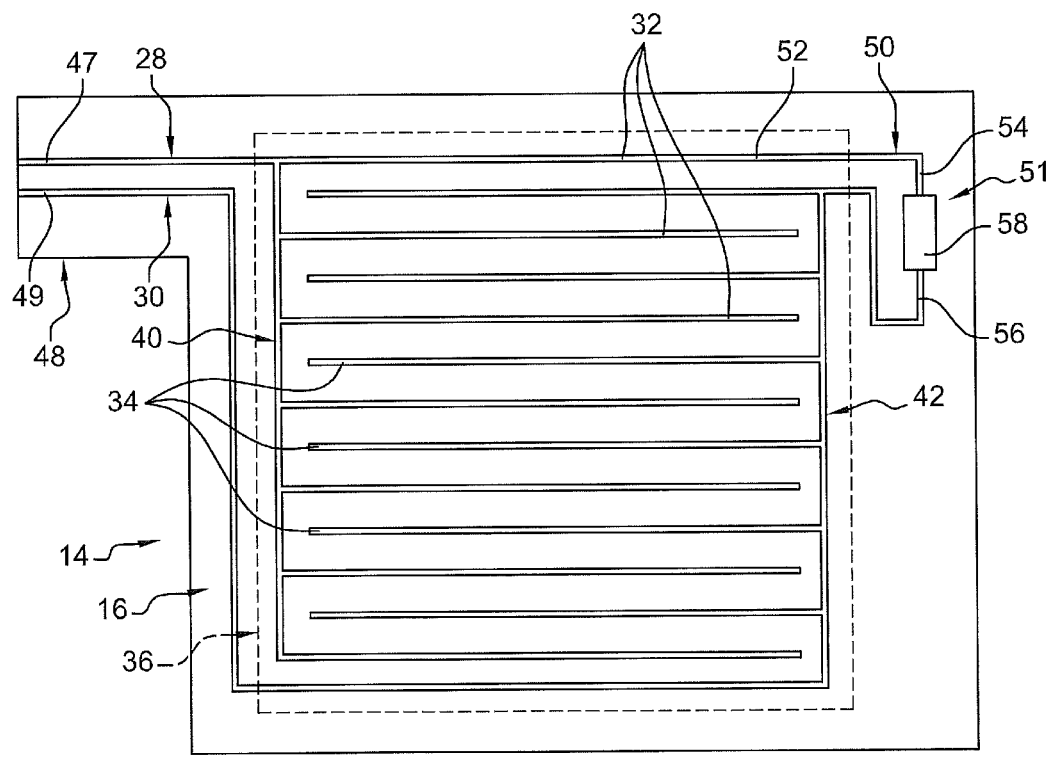
FIG. 4 is an upper view showing schematically the assembly of FIG. 2.

As shown in FIGS. 2, 3 and 4, assembly 14 comprises first 20 and second 22 substrates each having inner surfaces 24, 26. Preferably, said substrates 20, 22 are flexible in order to move towards the other one of the substrates in response to an applied force Fa. Substrates 20, 22 may be individual portions obtained from a sheet of material such as, for example, Mylar or PET (polyethylene terephthalate) material.

First and second electrically conductive traces 28, 30 are printed on the inner surface 24 of the first substrate 20 and a resistive layer 38 is arranged on the inner surface 26 of the second substrate 22.

First trace 28 includes a first set of parallel fingers 32 interdigitated with a second set of parallel fingers 34 pertaining to second trace 30 so as to define together a sensitive area 36 on the inner surface 24 of the first substrate 20, where the resistive layer 38 is facing the interdigitated fingers 32, 34. The first set of fingers 32 and the second set of fingers 34 are electrically separated from one another on the inner surface 24 of the first substrate 20.

According to the embodiment shown, the first trace 28 comprises a first transverse arm 40 from which extends a plurality of longitudinal fingers 32 towards a second transverse arm 42 of the second trace 30, a plurality of longitudinal fingers 34 extending from the second transverse arm 42 towards the first transverse arm 40.

As shown in FIG. 3, the first substrate 20 is positioned beneath the second substrate 22 such that traces 28, 30 are positioned beneath resistive layer 38. Of course, pre-loaded force sensing resistor 16 functions the same if first substrate 20 is positioned above second substrate 22 such that traces 28, 30 are positioned above resistive layer 38.

Traces 28, 30 may be formed on first substrate 20 by any suitable means known in the art. For example, traces 28, 30 may be formed by depositing conductive material onto first substrate 20 and then selectively removing portions of the conductive material to define the traces 28, 30. Traces 28, 30 may also be formed by depositing conductive polymer thick film ink (usually by screen printing) on first substrate 20.

Dimensions for traces 28, 30 depend on the dimensions of the force sensing resistor 16, material and construction for substrates 20, 22, material and construction for resistive layer 38, and the like.

Resistive layer 38 may be a force sensing resistor ink. First and second substrates 20, 22 are in contact with one another at all times such that resistive layer 38 of second substrate 22 contacts and electrically connects the fingers 32, 34 of first substrate 20 together. The biasing force Fb pressing the substrates 20, 22 against each other is present even in the absence of an externally applied force Fa on at least one of the substrates and corresponds to a rest state of the assembly 14.

According to the embodiment shown, the biasing force Fb is provided by holding tight the force sensing resistor 16 between a bottom support 41 and an upper cover 43. The upper cover 43 can be the outside cover of the system 10 on which a tactile pressure can be applied.

Resistive layer 38 shorts traces 28, 30 together with an electrical resistance that inversely depends on the amount of the biasing force Fb. As such, the electrical resistance between traces 28, 30 decreases (increases) as the biasing force Fb increases (decreases).

In accordance with the preferred embodiment of the invention, the biasing force Fb is substantially constant such that the electrical resistance between traces 28, 30 is substantially constant in the absence of an externally applied force Fa being applied.

While an external force Fa is applied to one of substrates 20, 22 in a direction toward the other one of the substrates (e.g. a touch press on the second substrate 22), the substrates 20, 22 contact one another with a greater force. That is, the substrates 20, 22 are subjected to the biasing force Fb and the externally applied force Fa which add to form a total force Ft. Resistive layer 38 shorts traces 28, 30 together with an electrical resistance that inversely depends on the amount of the total force Ft. As such, the electrical resistance between traces 28, 30 decreases as the total force increases.

According to the embodiment shown, assembly 14 further includes a rear adhesive layer 44 which adheres to the bottom side of first substrate 20. Not shown is an optional top environmental protection layer on top of second substrate 22.

Assembly 14 further includes a tail stiffener 46 for providing structural support to a connector portion 48 of first substrate 20. Tail stiffener 46 may provide additional thickness for meeting the specifications for insertion of the connector portion 48 into a complementary connector portion of the connection means 18. In the embodiment shown, the connector portion 48 has two connection pins 47, 49 corresponding respectively to the first 28 and second 30 traces.

According to an alternative embodiment (not shown), traces 28, 30 could be arranged within two zones formed of two sensitive areas delimited by two first and two second sets of fingers 32, 34. Multiple zones permit different functions such as locating the position of pressure on either substrate 20, 22, allowing independent pressure measurement in two locations, etc.

According to the teaching of the present invention, an auxiliary trace 50 is provided on the inner surface 24 of the first substrate 20 connecting the first trace 28 to the second trace 30 through a constant resistance 51 that is not dependent on the force Fa applied to the substrates 20, 22. Said constant resistance 51 is of a value R1 largely greater than the value Ra of the resistance which can be measured indirectly between the traces 28, 30 through the fingers 32, 34 when an external force Fa is applied to the substrates 20, 22, said value Ra being generally of less than 50 kilo-ohms. Preferably, constant resistance 51 has a value higher than 100 kilo-ohms, for example 200 kilo-ohms or 1 mega-ohm. Such constant resistance 51 does not need to be of high precision regarding its value R1; the value R1 only needs to be largely greater than the value of the variable resistance Ra.

According to the embodiment shown, said auxiliary trace 50 extends from a finger free end 52 of the first trace 28 to the second transverse arm 42. Preferably, said auxiliary trace 50 comprises a first portion 54 connected to the first trace 28 and a second portion 56 connected to the second trace 30. First 54 and second 56 portions extend toward each other along a transverse axis, and are electrically separated from one another on the inner face 24 of the first substrate 20 by a pad 58 of resistive layer forming the constant resistance 51, first 54 and second 56 portions being connected respectively to each transverse extremity of the pad 58. The resistive layer used for the pad 58 should be made at least partially of semi-conductive material and its dimensions and composition should be chosen depending on the constant resistance value R1 to be obtained.

Advantageously, said auxiliary trace 50 is arranged outside the sensitive area 36, no resistive layer 38 facing the constant resistance 51 on the inner surface 26 of the second substrate 22, such that its value R1 is predefined by construction and does not vary under external pressure Fa on the substrates 20, 22.

The central unit 12 controls the pressure sensitive transducer assembly 14 by applying either a reference voltage Vref or alternatively a reference frequency Fref, between first and second traces 28, 30 through the connection means 18 and the connector portion 48 such that:

in the absence of applied force Fa on the substrates 20, 22, a first electrical signal S1 indicative of a rest state is produced, in response to a force applied Fa to a flexible one of the substrates 20, 22, a second electrical signal S2 indicative of the applied force Fa is produced, when the assembly 14 is disconnected, a third electrical signal S3 indicative of assembly disconnection is produced, when the preload condition is lost, a fourth electrical signal S4 indicative of preload condition lost is produced.

Disconnection of the assembly 14 can happen because of mounting issues during the assembly of the system 10. The system 10 can even detect absence of the assembly 14 as it will appear as disconnected. In case part of the assembly is broken such that resistive layer 38 can no more short traces 28, 30, then it will also be detected by the system as assembly disconnection.

Now a control method for the system 10 according to the present invention will be described. Said control method comprises the steps of:

applying either a reference voltage Vref or a reference frequency Fref between first 28 and second 30 traces through said connection means 18, measuring the output voltage Vout, respectively the output frequency Fout of the assembly 14 through said connection means 18, comparing the output voltage Vout to various voltage levels V1, V2, V3, V4, respectively the output frequency Fout to various frequency levels V1, F2, F3, F4, producing an electrical signal indicative of the status of the assembly 14.

The electrical signal producing step is further defined as:

when the output voltage Vout, respectively the output frequency Fout, is equal to a rest state voltage V1, respectively rest state frequency V1, measured between first 28 and second 30 traces, a first electrical signal S1 is produced indicative of a rest state of the assembly 14, when the output voltage Vout, respectively the output frequency Fout, is a predetermined value V2, respectively F2, representative of an applied force Fa on the sensitive area 36, a second electrical signal S2 is produced indicative of said applied force Fa, and when the output voltage Vout, respectively the output frequency Fout, is substantially equal to a disconnection voltage V3, respectively disconnection frequency F3, indicating disconnection of the assembly 14, a third electrical signal S3 is produced.

Preferably, when the output voltage Vout, respectively the output frequency Fout, is substantially equal to a preload lost voltage V4, respectively preload lost frequency F4, measured between first 28 and second 30 traces through said constant resistance 51, a fourth electrical signal S4 is produced indicative of the preload condition of the assembly 14 being lost.

Another important issue for an assembly 14 as above presented is to provide reliable diagnostic means that would supply a whole range of force sensing resistor diagnostic. These diagnostic means would preferably include:

the resistive layer 38 for providing information about bad contact between the connector portion 48 and the complementary portion of the connection means 18, a frequency driver (not shown) for detecting loss of preload condition and use of the force sensing resistor 16 out of its normal operative range, the constant resistance 51 for detecting any kind of electronics failure on the force sensing resistor 16 and to improve preload loss threshold accuracy by compensating the low precision of the resistive layer 38.

Full diagnostic capabilities are summarized in the Table 1 below:

TABLE 1

| Diagnostic status | Any electronics failure | Bad contact | Preload lost | Normal operating range | FSR out of range |
|---|---|---|---|---|---|
| FSR driver output frequency | No oscillation | Low frequency guaranteed by external resistor | Low frequencies guaranteed by printed resistor  0 Hz → Fmax | Nominal frequencies | Frequency above a certain threshold |
| FSR function | | NOK | | OK | |

Figure 5:
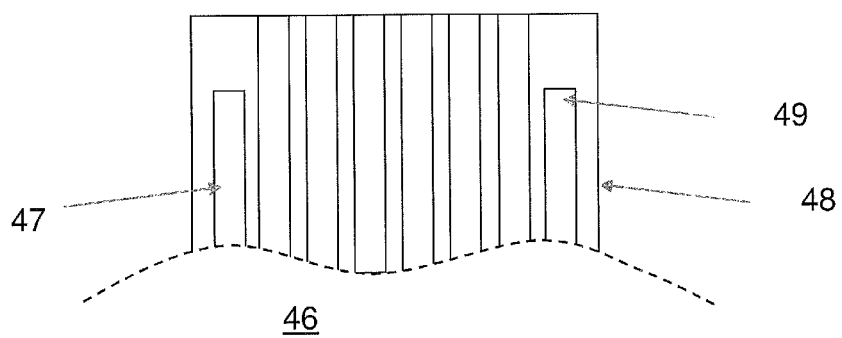
FIG. 5 is a view of the connector portion of an assembly of FIG. 2 showing schematically its contact pins.

Furthermore, the diagnostic status is sufficient to guarantee a good insertion of the connector portion 48 in the complementary portion of the connection means 18, if the connector portion 48 is designed with a specific pattern as shown in FIG. 5 for instance. When several connection pins are present in the connector portion 48, external connection pins 47, 49 are slightly shorter than the others but these external pins are not additional ones for diagnostic purpose. Having external pins shorter than the others, in conjunction with previously presented diagnostic method permits to check the right insertion of the connector portion 48. Indeed, if contact is OK on the two external traces, insertion is necessarily OK. Mechanical maintaining will be ensured, because insertion length is guaranteed. On the other hand, if the connector portion is inserted on the skew, bad contact diagnostic status flag may be set. If such flag is not set, the connection quality will then be sufficient. With those solutions we can remove visual check or camera testing.

A more detailed description of the general concept of preloaded force sensing resistor can be found in document WO2009/070503A1 which is incorporated by reference.

The invention has been described in connection with an embodiment using preloaded force sensing resistor. Alternatively, it could also apply mutatis mutandis to an embodiment using standard force sensing resistor.

When using standard force sensing resistor, the invention allows distinguishing between disconnection state and rest state. Thus, the output voltage Vout is substantially equal to the disconnection voltage V3 indicating disconnection of the assembly 14 and the output voltage Vout is substantially equal to the rest state voltage V1 when the assembly 14 is in its rest state. In this case, the rest state voltage V1 corresponds to the voltage measured between first and second traces 28, 30 through the constant resistance 51.

While this invention has been described in terms of the preferred embodiments thereof, it is not intended to be so limited, but rather only to the extent set forth in the claims that follow.

The invention claimed is:

1. A pressure sensitive transducer assembly that includes a force sensing resistor, said force sensing resistor comprising:

a first substrate and a second substrate each having inner surfaces, wherein at least one of the substrates is flexible in order to move towards the other one of the substrates in response to an applied force;

electrically conductive traces on the inner surface of at least the first substrate, said electrically conductive traces including a first trace including a first set of fingers interdigitated with a second set of fingers pertaining to a second trace so as to define together a sensitive area responsive to the applied force, the first set of fingers and the second set of fingers being electrically separated from one another on the inner surface of the first substrate;

a resistive layer on the inner surface of the second substrate such that the resistive layer is facing the first set of fingers such that, in response to the force being applied to the flexible one of the substrates, the resistive layer contacts and electrically connects fingers of the first set of fingers to fingers of the second set of fingers together in a manner effective to exhibit a variable resistance dependent upon resistivity of the resistive layer and dependent upon the applied force; and an auxiliary trace on the inner surface of one of the substrates connecting the first trace to the second trace through a constant resistance that is not dependent on the force applied to the substrates, said constant resistance being of a value largely greater than the value of the variable resistance which can be measured indirectly between the traces through the fingers when the external force is applied to the assembly.

2. The assembly as set forth in claim 1, wherein said force sensing resistor is configured to work under a preload condition, wherein said resistive layer is in contact with fingers when the assembly is in a rest state of the assembly.

3. The assembly as set forth in claim 1, wherein said auxiliary trace is arranged outside the sensitive area.

4. The assembly (14) as set forth in claim 1, wherein the first trace comprises a first transverse arm from which extends a plurality of longitudinal fingers towards a second transverse arm of the second trace, a plurality of longitudinal fingers extending from the second transverse arm towards the first transverse arm, said auxiliary trace extending from a finger free end of the first trace to the second transverse arm.

5. The assembly as set forth in claim 1, wherein said auxiliary trace comprises a first portion connected to the first trace and a second portion connected to the second trace, said first and second portions being electrically separated from one another by a pad of resistive layer forming the constant resistance.

6. The assembly as set forth in claim 1, wherein said first trace, said second trace, and said auxiliary trace are arranged on the inner surface of the first substrate.

7. The assembly as set forth in claim 1, wherein the assembly further comprises diagnostic means including said constant resistance for detecting electronics failure of the force sensing resistor.

8. The assembly as set forth in claim 7, wherein said diagnostic means further includes a frequency driver of the force sensing resistor for detecting loss of a preload condition and operation out of a normal operating range.

9. The assembly as set forth in claim 8, wherein said constant resistance is used for improving detection of loss of preload condition with a more accurate threshold.

10. The assembly as set forth in claim 7, wherein said diagnostic means further includes said resistive layer for detecting bad contact between said assembly and an external central unit through connecting means.

11. The assembly (14) as set forth in claim 10, wherein said connecting means includes several connection pins with a specific pattern where the two external connection pins are slightly shorter than other central connection pins and wherein said diagnostic means further includes said specific pattern of the connecting means for detecting disconnection of the assembly.

12. A system comprising a central unit that controls a pressure sensitive transducer assembly according to claim 1, said central unit being connected to said assembly through connection means in order to apply a reference voltage between the first trace and second of the assembly such that:
in the absence of applied force on the substrates, a first electrical signal indicative of a rest state is produced,
in response to a force applied to a flexible one of the substrates, a second electrical signal indicative of the applied force is produced, and
when the assembly is disconnected, a third electrical signal indicative of assembly disconnection is produced.

13. The system as set forth in claim 12, wherein the system further comprises an assembly as set forth in claim 2 such that, when the preload condition is lost and the reference voltage (Vref) is applied between first and second traces, a fourth electrical signal indicative of preload condition lost is produced.

14. A control method for a system according to claim 12, comprising the steps of:
applying a reference quantity being either a voltage or a frequency between first and second traces through said connection means;
measuring the output quantity of the assembly through said connection means;
comparing the output quantity to various quantity levels; and
producing an electrical signal indicative of the status of the assembly, wherein
when the output quantity is equal to a rest state quantity measured between first and second traces, a first electrical signal is produced indicative of a rest state of the assembly,
when the output quantity is equal to a predetermined value representative of an applied force on the sensitive area, a second electrical signal is produced indicative of said applied force, and
when the output quantity is substantially equal to a disconnection quantity indicating disconnection of the assembly 14, a third electrical signal is produced indicating disconnection of the assembly.

15. The control method as set forth in claim 14 applied to the system according to claim 13, wherein, when the output quantity is substantially equal to a preload lost quantity measured between first and second traces through said constant resistance, a fourth electrical signal (S4) is produced indicative of the preload condition of the assembly (14) being lost.

* * * * *